L. W. ANDERSEN.
CANOPY FOR GAS AND ELECTRIC LIGHT FIXTURES.
APPLICATION FILED SEPT. 14, 1910.
978,532.
Patented Dec. 13, 1910.
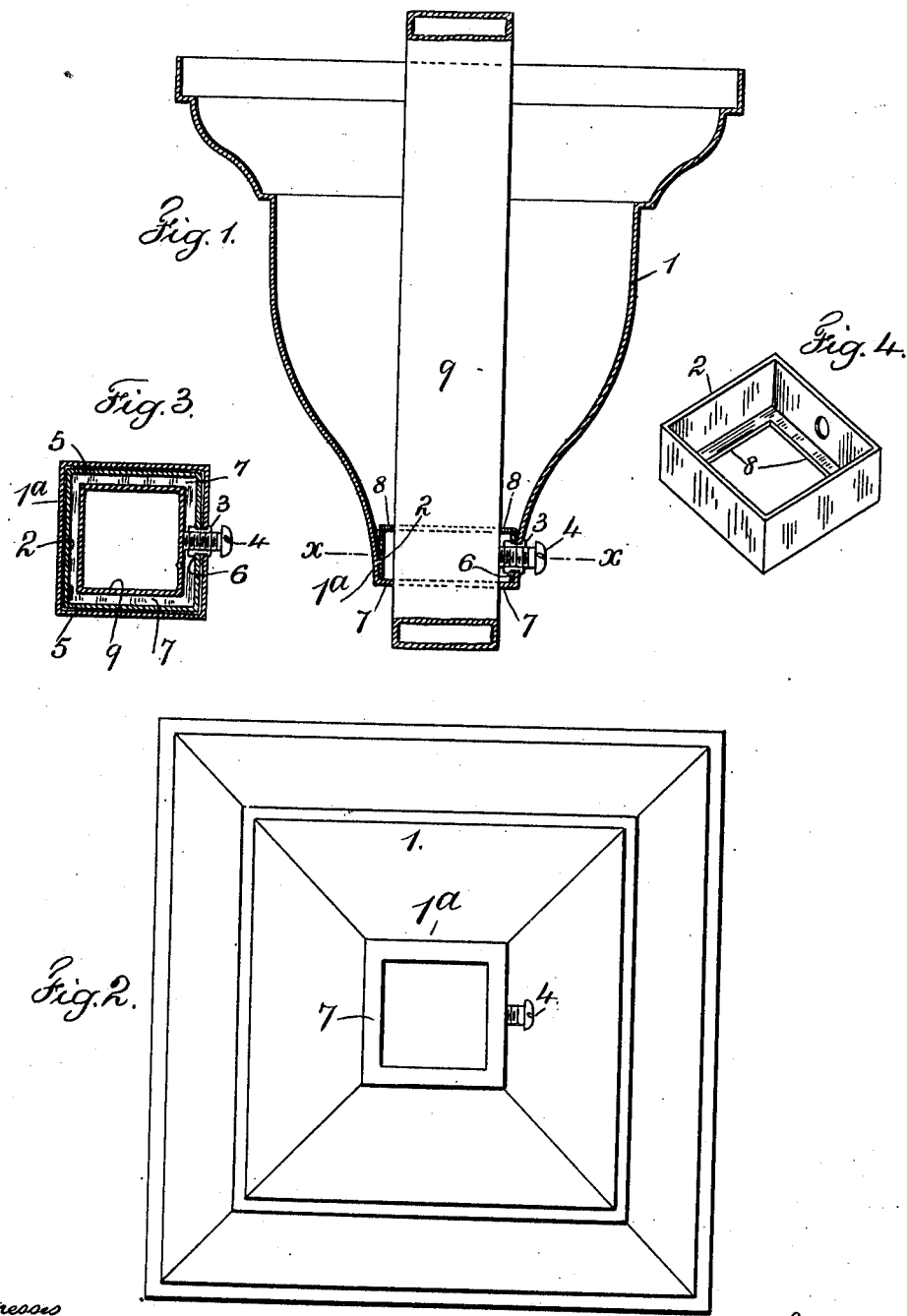

UNITED STATES PATENT OFFICE.

LAURITZ W. ANDERSEN, OF WATERBURY, CONNECTICUT, ASSIGNOR TO THE PLUME AND ATWOOD MANUFACTURING COMPANY, OF WATERBURY, CONNECTICUT, A CORPORATION OF CONNECTICUT.

CANOPY FOR GAS AND ELECTRIC-LIGHT FIXTURES.

978,532.  Specification of Letters Patent.  Patented Dec. 13, 1910.

Application filed September 14, 1910. Serial No. 581,942.

*To all whom it may concern:*

Be it known that I, LAURITZ W. ANDERSEN, a citizen of the United States, residing at Waterbury, in the county of New Haven and State of Connecticut, have invented an Improvement in Canopies for Gas and Electric-Light Fixtures, of which the following is a specification.

My invention relates to a canopy for the pipe or tubing of electric or gas fixtures. In canopies for such purpose, it is customary to form a bead on the contracted end through which a set screw passes to hold the canopy on the pipe or tubing. Canopies so constructed are only adapted to one size and shape of pipe or tubing, and have not sufficient bearing surface on the pipe to keep them steady, unless the other end is in close contact with the ceiling or side wall, or other supporting surface.

The object of my present invention is to dispense with the bead and provide spaced apart bearings within the canopy so as to keep the canopy in steady position upon the pipe or tubing, regardless of additional support, and I make the canopy in such a manner that a canopy of one size can be fitted to pipes or tubing of various sizes within reasonable limits.

In the accompanying drawing, Figure 1 is a vertical section and elevation showing my invention attached to a tubing. Fig 2 is a plan of the same. Fig. 3 is a cross section at the dotted line $x$, $x$, Fig. 2, and Fig. 4 is a perspective view of the inner supporting shell as removed from the canopy.

Similar numerals refer to similar parts throughout the several views.

The shell or canopy body 1 is provided with a neck or contracted end 1ª, but may be otherwise of any desired ornamental shape and configuration.

2 represents an inner auxiliary shell fitting and secured within the neck of the canopy. This inner shell 2 is open at the end in contact with the inner surface of the neck 1ª, of the canopy, but when manufactured is closed at the other end, as is also the contracted end of the canopy. This is for the purpose of adapting the canopy to pipes or tubing of different sizes and shapes, as both shells are afterward correspondingly pierced, leaving alined openings for the pipe or tubing of the desired size and shape.

3 is a bushing interiorly screw-threaded for a set screw 4. This bushing 3 passes through holes in both the canopy shell 1 and inner shell 2, and may be secured to each by solder or in any other suitable manner, but I prefer and have shown it as provided with a shoulder 6 on its inner end which takes against the inner surface of the shell 2, the bushing being inserted from within and its outer edge upset over the canopy shell 1. The inner shell 2 is made of a shape corresponding to the shape of the neck or contracted end of the canopy 1 and of a size to fit snugly within the neck of the canopy to which it is securely fastened by any suitable means. I have shown it secured by solder at 5, Fig. 3, on two sides, but it is apparent that the bushing 3 forms an additional means for holding the inner shell in position.

The flanges 7 and 8 formed when the closed ends of the shells 1 and 2 are pierced, provide two spaced apart interior bearings for the pipe or tubing 9 to which it may be fitted and by which means the canopy is held steady in the position on the pipe to which it may be clamped by the set screw, and it will be understood that the screw-threaded bushing not only forms a guide and support for the set screw, providing always for a true adjustment of the same, but the screw cannot readily work out and become mislaid or lost, as is the case where the screw passes through only one thickness of comparatively thin sheet metal such as in the beads usually provided on canopies of this character and similar sheet metal goods.

I claim as my invention:

1. A canopy for the pipe or tubing of electric or gas fixtures, comprising a hollow body contracted at one end with a perforation therein, a device interior of the canopy also perforated and forming in connection with said perforated end two spaced apart shell bearings inverted to one another receiving the pipe or tubing, and means passing through both said parts adapted for holding the canopy to the tubing.

2. A canopy for the pipe or tubing of electric or gas fixtures, comprising a hollow body contracted at one end to form a hollow neck perforated at the end, a shell open at one end and perforated at the other end and secured within said neck and forming in connection with the perforated end of said neck two spaced apart bearings for a pipe or tubing, and adjustable means for holding the canopy upon the pipe or tubing at the desired position.

3. A canopy for the pipe or tubing of electric or gas fixtures, comprising a hollow body contracted at one end to form a hollow neck perforated at the end, a shell open at one end and perforated at the other end and secured within said neck and forming in connection with the perforated end of said neck two spaced apart bearings for a pipe or tubing, a bushing interiorly screw-threaded passing through the body portion and through said shell and secured thereto and connecting them together at that point, and a screw adapted to be passed through said bushing and take against the pipe or tubing to hold the canopy upon the same.

Signed by me this 8th day of September, 1910.

LAURITZ W. ANDERSEN.

Witnesses:
A. J. STORZ,
C. W. NORTHROP.